United States Patent
Stahl et al.

(10) Patent No.: US 10,967,731 B2
(45) Date of Patent: Apr. 6, 2021

(54) TANK DEVICE, IN PARTICULAR IN A VEHICLE

(71) Applicant: Bayerische Motoren Werke Aktiengesellschaft, Munich (DE)

(72) Inventors: Hans-Ulrich Stahl, Munich (DE);
Julius Basler-Meier, Munich (DE);
Andreas Pelger, Ismaning (DE);
Thomas Gruber, Roehrmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 138 days.

(21) Appl. No.: 15/352,633

(22) Filed: Nov. 16, 2016

(65) Prior Publication Data

US 2017/0057340 A1 Mar. 2, 2017

Related U.S. Application Data

(63) Continuation of application No. PCT/EP2015/065185, filed on Jul. 3, 2015.

(30) Foreign Application Priority Data

Jul. 15, 2014 (DE) ..................... 10 2014 213 762.4

(51) Int. Cl.
*B60K 15/03* (2006.01)

(52) U.S. Cl.
CPC .................. *B60K 15/03006* (2013.01); *B60K 2015/03019* (2013.01); *B60K 2015/03315* (2013.01)

(58) Field of Classification Search
CPC ...... F17C 1/00; F17C 5/06; F17C 5/02; F17C 9/02; F17C 13/023; F17C 13/028;
(Continued)

(56) References Cited

U.S. PATENT DOCUMENTS

| 4,139,019 A | 2/1979 | Bresie et al. |
| 6,807,952 B1 | 10/2004 | Amellal et al. |

(Continued)

FOREIGN PATENT DOCUMENTS

| CA | 2 539 232 A1 | 9/2006 |
| CN | 201525274 U | 7/2010 |

(Continued)

OTHER PUBLICATIONS

German-language Search Report issued in counterpart German Application No. 10 2014 213 762.4 dated Mar. 23, 2015 with partial English translation (11 pages).

(Continued)

*Primary Examiner* — Anthony D Stashick
*Assistant Examiner* — James M Van Buskirk
(74) *Attorney, Agent, or Firm* — Crowell & Moring LLP

(57) ABSTRACT

A tank device, in particular in a vehicle, has a pressure tank for storing fuel and a fuel line for filling the pressure tank which extends from outside of the pressure tank through a tank opening up to a free line end in the interior of the pressure tank. The fuel line in the pressure tank has at least one line outlet through which the fuel can flow out of the fuel line into the pressure tank. The fuel line, between the tank opening and the free line end, has a flexible line section such that the flexible line section moves when the pressure tank is filled.

16 Claims, 1 Drawing Sheet

(58) Field of Classification Search
CPC ..... F17C 13/04; B65B 3/18; B60K 15/03006; B60K 15/03315; B60K 15/03019
USPC ........................................................ 220/562
See application file for complete search history.

(56) References Cited

U.S. PATENT DOCUMENTS

| | | | | |
|---|---|---|---|---|
| 6,990,998 | B1* | 1/2006 | Amellal | B01D 35/0273 137/547 |
| 8,915,322 | B2* | 12/2014 | Gibb | B60K 15/013 180/69.5 |
| 2010/0101669 | A1* | 4/2010 | Geurtz | B60K 15/04 137/592 |
| 2015/0033674 | A1* | 2/2015 | Downie | F17C 1/00 53/467 |

FOREIGN PATENT DOCUMENTS

| | | |
|---|---|---|
| DE | 10 2004 016 160 A1 | 10/2005 |
| DE | 10 2011 114 728 A1 | 4/2013 |
| EP | 1 179 702 A1 | 2/2002 |
| EP | 2 466 186 A1 | 6/2012 |
| FR | 2 840 971 A1 | 12/2003 |

OTHER PUBLICATIONS

International Search Report (PCT/ISA/210) issued in PCT Application No. PCT/EP2015/065185 dated Sep. 22, 2015 with English translation (7 pages).
German-language Written Opinion (PCT/ISA/237) issued in PCT Application No. PCT/EP2015/065185 dated Sep. 22, 2015 (6 pages).
Chinese-language Office Action issued in counterpart Chinese Application No. 201580020460.3 dated Feb. 1, 2018 with English translation (13 pages).
English translation of Chinese Office Action issued in counterpart Chinese Application No. 201580020460.3 dated Oct. 16, 2018 (six pages).
German-language European Office Action issued in counterpart European Application No. 15732287.6 dated Feb. 26, 2019 (seven (7) pages).
Chinese-language Office Action issued in counterpart Chinese Application No. 201580020460.3 dated May 7, 2019 with English translation (13 pages).

* cited by examiner

TANK DEVICE, IN PARTICULAR IN A VEHICLE

CROSS REFERENCE TO RELATED APPLICATIONS

This application is a continuation of PCT International Application No. PCT/EP2015/065185, filed Jul. 3, 2015, which claims priority under 35 U.S.C. § 119 from German Patent Application No. 10 2014 213 762.4, filed Jul. 15, 2014, the entire disclosures of which are herein expressly incorporated by reference.

BACKGROUND AND SUMMARY OF THE INVENTION

The invention relates to a tank device, in particular in a vehicle, having a pressure tank for storing fuel and a fuel line for filling the pressure tank. The fuel line extends from outside of the pressure tank through a tank opening up to a free line end in the interior of the pressure tank, wherein the fuel line in the pressure tank has at least one line outlet through which fuel can flow out of the fuel line into the pressure tank.

Such tank devices with a pressure tank are particularly used in vehicles which are driven by gaseous fuels such as hydrogen or natural gas. Refueling is generally carried out at a high filling pressure to keep the refueling duration low. The pressure tanks are customarily designed as elongated cylinders and are refueled on their end side via a fuel line. Particularly with very long, cylindrical pressure tanks having a small cylinder cross section, only slight fuel mixing occurs in this case and the filling of the pressure tank is carried out in a substantially axially layered manner from "rear to front". So-called "hot spots" may occur here, that is to say local accumulations of gas volumes greatly heated by compression.

The tank wall of the pressure tank is nonuniformly heated due to these hot spots, resulting in localized overheating and local temperature stresses which may ultimately lead to damage to the tank wall and to a reduced service life of the pressure tank.

On account of these temperature differences in the pressure tank that occur during refueling and on account of the customarily temperature-dependent calculation of the filling level, incomplete filling or even undesired overfilling of the pressure tank may also occur.

In order to solve the aforementioned problems, it is of course conceivable to refuel the vehicle more slowly and to wait for a corresponding temperature equalization. However, this would lead to a considerably increased refueling duration and be accordingly less acceptable to the user of the vehicle.

The object of the invention is to provide a tank device in a vehicle that allows quick refueling with good gas mixing and uniform temperature distribution in the pressure tank.

This and other objects are achieved by a tank device of the type mentioned at the outset, in which the fuel line has, between the tank opening and the free line end, such a flexible line section that the flexible line section moves when filling the pressure tank. During filling of the pressure tank, the dynamics of the fuel line within the pressure tank lead to considerably improved mixing of the fuel and thus to particularly uniform temperature distribution in the pressure tank. Undesired "hot spots" and the negative phenomena accompanying them are prevented simply and inexpensively in this way.

In one embodiment of the tank device, a fixed bearing for the fuel line is formed on the edge of the tank opening, wherein, starting from this bearing, the fuel line extends unsupported into the pressure tank, that is to say without further fastening or mounting. In other words, this means that the fuel line is fixedly clamped in at this bearing and projects freely into the pressure tank.

The flexible line section preferably has the free line end and at least one line outlet. Consequently, the fuel flowing out into the pressure tank generates an impulse which sets the flexible line section in motion.

Owing to the low production and assembly outlay, the flexible line section is preferably formed by a hosepiece.

According to one embodiment of the tank device, the flexible line section extends from the tank opening to the line end.

According to an alternative embodiment, the fuel line has a substantially rigid line section which extends from outside of the pressure tank through the tank opening up to a coupling point at which the flexible line section is connected. In this embodiment of the tank device, the flexible line section preferably extends from the coupling point up to the line end.

The pressure tank is preferably a substantially cylindrical pressure tank, wherein the tank opening is provided on an end side of the pressure tank. With particular preference, the pressure tank is of circular cylindrical design and has a length/diameter ratio of at least 3:1, in particular at least 5:1.

The tank opening is preferably arranged substantially centrally on the end side of the pressure tank, wherein, in particular, a longitudinal axis of the pressure tank can extend through the tank opening. By virtue of this largely central tank opening, the freedom of movement of the flexible line section in the radial direction is not restricted, with the result that particularly good mixing and uniform temperature distribution of the fuel in the pressure tank can be obtained.

In a further embodiment of the tank device, an elastic impact body which can come into contact with a tank wall of the pressure tank is fastened to the flexible line section. This elastic impact body is designed, for example, in the manner of a rubber ball and, when impacting against the tank wall, ensures an additional impulse and thus a yet more dynamic movement of the flexible line section. The more dynamic the movement of the flexible line section in the pressure tank, the better the fuel mixes when filling the pressure tank and the more uniform the temperature distribution within the pressure tank.

In this embodiment of the tank device, the elastic impact body is preferably fastened to the free line end of the fuel line. In this way, the impact body comes into contact with the tank wall in a particularly simple manner and can accordingly ensure particularly high dynamics of the flexible line section when filling the pressure tank.

The elastic impact body preferably encloses the fuel line, with the result that the impulse of the impact body is largely independent of the impact direction. Furthermore, the elastic impact body can prevent the free line end from striking the tank wall and possibly damaging the latter.

According to a further embodiment of the tank device, the pressure tank is a hydrogen tank for storing hydrogen. However, beside hydrogen, it is also possible for other, in particular gaseous fuels such as natural gas to be used as fuel.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
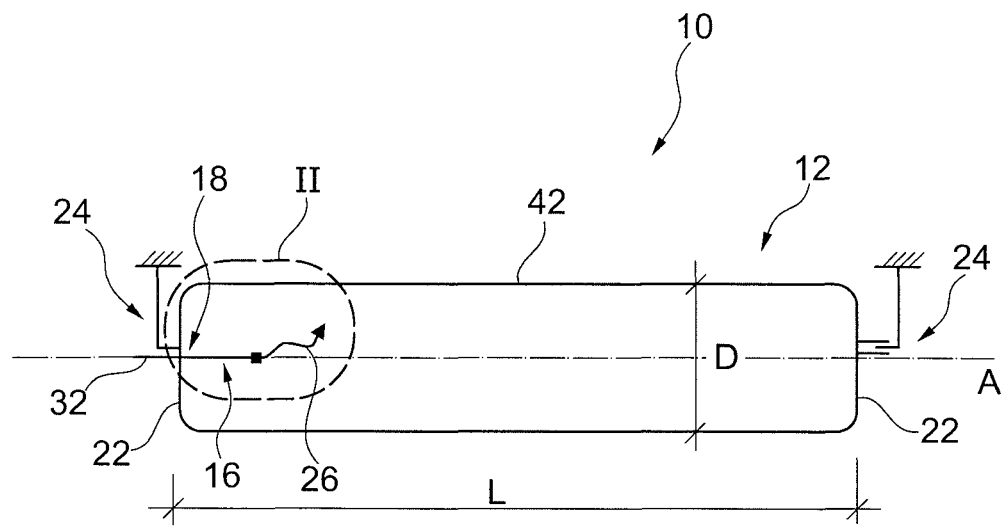
FIG. 1 is a schematic diagram of the tank device in a vehicle according to an embodiment of the invention.

FIG. 1 shows a tank device 10 in a vehicle, which device has a pressure tank 12 for storing fuel 14 and a fuel line 16 for filling the pressure tank 12. The fuel line 16 extends from outside of the pressure tank 12 through a tank opening 18 up to a free line end 20 in the interior of the pressure tank 12.

In the present case, the pressure tank 12 is a cylindrical, in particular circular cylindrical, pressure tank 12 with a longitudinal axis A, wherein the tank opening 18 is provided on an end side 22 of the pressure tank 12.

The fuel tanks used in vehicles are usually elongate pressure tanks 12 whose length L is considerably greater than their diameter D. The tank device 10 described within this application has proven to be particularly advantageous in particular with pressure tanks 12 having a length/diameter ratio of L:D>3:1, the length/diameter ratio according to FIG. 1 being L:D≈5:1.

To fasten the pressure tank 12 in the vehicle, FIG. 1 shows two end tank bearings 24 by means of which the pressure tank 12 is fixedly connected to a body of the vehicle.

In the illustrated exemplary embodiment of the tank device 10, the fuel 14 used is hydrogen, and therefore the pressure tank 12 is a hydrogen tank for storing hydrogen. Alternatively, however, the use of other, in particular gaseous fuels 14, such as, for example, natural gas, is also contemplated.

Figure 2:
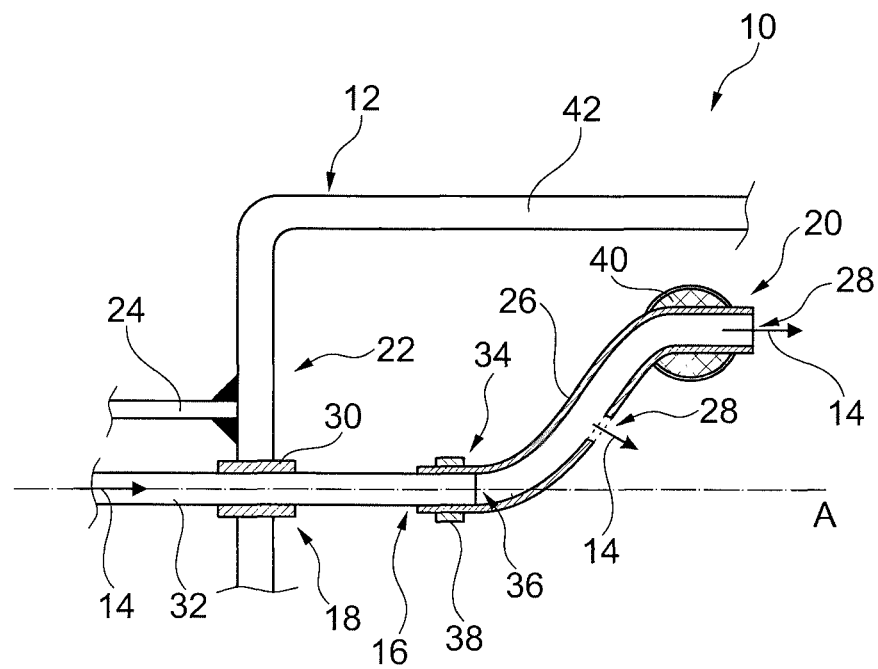
FIG. 2 is a schematic detail section II of the tank device according to FIG. 1.

FIG. 2 shows a detail section II of the tank device 10 according to FIG. 1 in the region of the fuel line 16.

It becomes clear here that the fuel line 16 has a flexible line section 26 between the tank opening 18 and the free line end 20, wherein, on account of its flexibility, this line section 26 moves when filling the pressure tank 12 with fuel 14.

On account of the movement of the flexible line section 26, good fuel mixing is achieved when filling the pressure tank 12, with the result that substantially uniform temperature distribution is obtained in the pressure tank 12 and local temperature peaks (so-called "hot spots") are avoided.

The fuel line 16 has at least one line outlet 28 in the pressure tank 12 through which fuel 14 can flow out of the fuel line 16 into the pressure tank 12. According to FIG. 2, the flexible line section 26 has both the line end 20 and two line outlets 28, wherein one line outlet 28 is provided directly at the axial line end 20 and the other line outlet 28 is provided in the peripheral wall of the flexible line section 26. Here, the line outlet 28 in the peripheral wall ensures particularly high dynamics of the flexible line section 26 when filling the pressure tank 12 with fuel 14.

Here, fuel mixing in the pressure tank 12 results, on the one hand, directly from the movement of the flexible line section 26, which causes fuel 14 in the pressure tank 12 to be swirled, and, on the other hand, from a permanent change in position of the line outlet 28 and an accompanying, permanent change in the outlet direction of the fuel 14 into the pressure tank 12.

A fixed bearing 30 for the fuel line 16 is formed on the edge of the tank opening 18, wherein, starting from this fixed bearing 30, the fuel line 16 extends unsupported into the pressure tank 12, that is to say without further fastening or mounting on the pressure tank 12. The fuel line 16 is thus fixedly clamped in at the bearing 30 and projects freely into the pressure tank 12.

The fuel line 16 has a substantially rigid line section 32 which extends from outside of the pressure tank 12 through the tank opening 18 up to a coupling point 34 at which the flexible line section 26 is connected. In the present case, the flexible line section 26 extends from this coupling point 34 up to the free line end 20 of the fuel line 16.

According to FIG. 2, the flexible line section 26 is formed by a hosepiece which is plugged onto an axial end 36 of the rigid line section 32 and is fastened to the rigid line section 32 by a clamping ring 38.

According to an alternative variant embodiment (not shown), the flexible line section 26 could extend directly from the tank opening 18 up to the free line end 20, with the result that the coupling point 34 is formed directly on the fixed bearing 30 of the fuel line 16.

In the present exemplary embodiment of the tank device 10, the tank opening 18 is arranged centrally on the end side 22 of the pressure tank 12, with the result that the longitudinal axis A of the cylindrical pressure tank 12 extends through the tank opening 18. Owing to this central arrangement, the flexible line section 26 or the free line end 20 of the fuel line 16 has a large freedom of movement in the radial direction.

To increase the dynamics of the flexible line section 26, according to FIG. 2, an elastic impact body 40 which can come into contact with a tank wall 42 of the pressure tank 12 is fastened to the flexible line section 26, specifically to the free line end 20 of the fuel line 16.

The elastic impact body 40 is designed, in particular, to be spherical, for example as a rubber ball, and encloses the fuel line 16. In this way, the elastic impact body 40 increases not only the dynamics in the flexible line section 26 when refueling the vehicle but also prevents the free line end 20 from striking the tank wall 42 of the pressure tank 12 and possibly damaging the wall.

When filling the pressure tank 12 with fuel 14, good fuel mixing and thus particularly uniform temperature distribution in the pressure tank 12 are achieved by the free, uncontrolled movement of the flexible line section 26. Therefore, the tank device 10 described prevents both damage to the tank wall 42 resulting from temperature stresses and improper calculation of the filling level in the pressure tank 12 resulting from local temperature differences. There is no need here for a reduction in the filling pressure which would lead to an undesired increase in the refueling duration.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A tank device for a vehicle, comprising:
   a pressure tank oriented in a horizontal plane of the vehicle for storing gaseous fuel to be filled at a filling pressure; and
   a fuel line for filling the pressure tank, the fuel line extending from outside the pressure tank through a tank opening in the pressure tank up to a free line end in the interior of the pressure tank, wherein the fuel line in the pressure tank has at least one line outlet through which fuel is flowable out of the fuel line into the pressure tank, between the tank opening and the free line end, the fuel line comprises a flexible line section that freely moves in a radial direction in an unrestricted manner when filling the pressure tank with the gaseous fuel, and the pressure tank is a cylindrical pressure tank having a length to diameter ratio of greater than 3:1.

2. The tank device according to claim 1, further comprising:

a fixed bearing for the fuel line, the fixed bearing being formed on an edge of the tank opening, wherein starting from the fixed bearing, the fuel line extends unsupported into the pressure tank.

3. The tank device according to claim 1, wherein the free line end and the at least one line outlet are in the flexible line section.

4. The tank device according to claim 2, wherein the free line end and the at least one line outlet are in the flexible line section.

5. The tank device according to claim 1, wherein the flexible line section comprises a hose piece.

6. The tank device according to claim 1, wherein the flexible line section extends from the tank opening up to the free line end.

7. The tank device according to claim 1, wherein:

the fuel line further comprises a substantially rigid line section, and the substantially rigid line section extends from outside of the pressure tank through the tank opening up to a coupling point at which the flexible line section is connected.

8. The tank device according to claim 7, wherein the flexible line section extends from the coupling point up to the free line end.

9. The tank device according to claim 1, wherein the tank opening is provided on an end side of the cylindrical pressure tank.

10. The tank device according to claim 9, wherein the tank opening is arranged substantially centrally on the end side of the cylindrical pressure tank.

11. The tank device according to claim 1, wherein the pressure tank is a hydrogen tank that stores hydrogen.

12. A tank device, comprising:

a pressure tank for storing fuel;

a fuel line for filling the pressure tank, the fuel line extending from outside the pressure tank through a tank opening in the pressure tank up to a free line end in the interior of the pressure tank, wherein the fuel line in the pressure tank has at least one line outlet through which fuel is flowable out of the fuel line into the pressure tank, and between the tank opening and the free line end, the fuel line comprises a flexible line section that moves when filling the pressure tank; and an elastic impact body fastened to the flexible line section, wherein the elastic impact body is arranged so as to come into contact with a tank wall of the pressure tank when filling the pressure tank.

13. The tank device according to claim 12, wherein the elastic impact body encloses the fuel line.

14. The tank device according to claim 12, wherein the elastic impact body is fastened to the free line end of the fuel line.

15. The tank device according to claim 14, wherein the elastic impact body encloses the fuel line.

16. A tank device, comprising:

a pressure tank for storing gaseous fuel to be filled at a filling pressure; and a fuel line for filling the pressure tank, the fuel line extending from outside the pressure tank through a tank opening in the pressure tank up to a free line end in the interior of the pressure tank, wherein between the tank opening and the free line end, the fuel line comprises a flexible line section that freely moves in a radial direction in an unrestricted manner when filling the pressure tank with the gaseous fuel, and the fuel line in the pressure tank has a first line outlet disposed at the free line end and a second line outlet disposed between the tank opening and the first line outlet, through which first and second line outlets fuel is flowable out of the fuel line into the pressure tank.

* * * * *